June 12, 1934.　　　　R. R. WEDDELL　　　　1,962,162
STEP LOCKED INSERTED BLADE CUTTER
Filed March 27, 1931　　　2 Sheets-Sheet 1
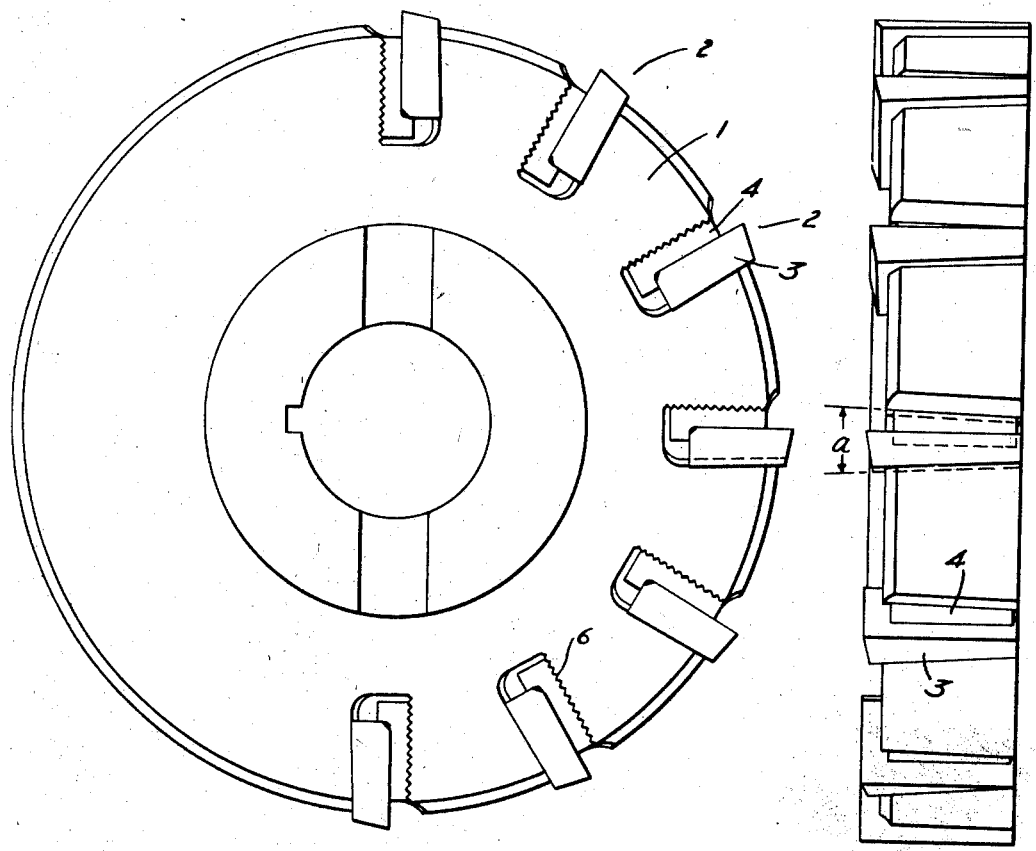
Fig. 1.　　　　Fig. 2.
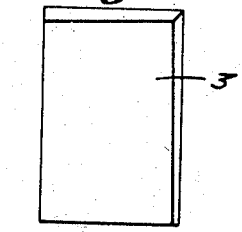 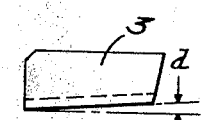 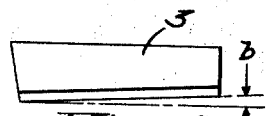 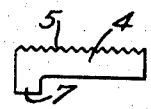 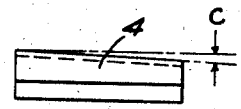
Fig. 3.　Fig. 4.　Fig. 6.　Fig. 7.
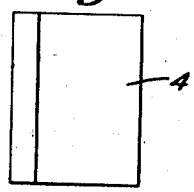
Fig. 5.　　Fig. 8.
Inventor
Ralph R. Weddell
By Attorney
Nathan, Bowman & Helfrich June 12, 1934.  R. R. WEDDELL  1,962,162
STEP LOCKED INSERTED BLADE CUTTER
Filed March 27, 1931  2 Sheets-Sheet 2
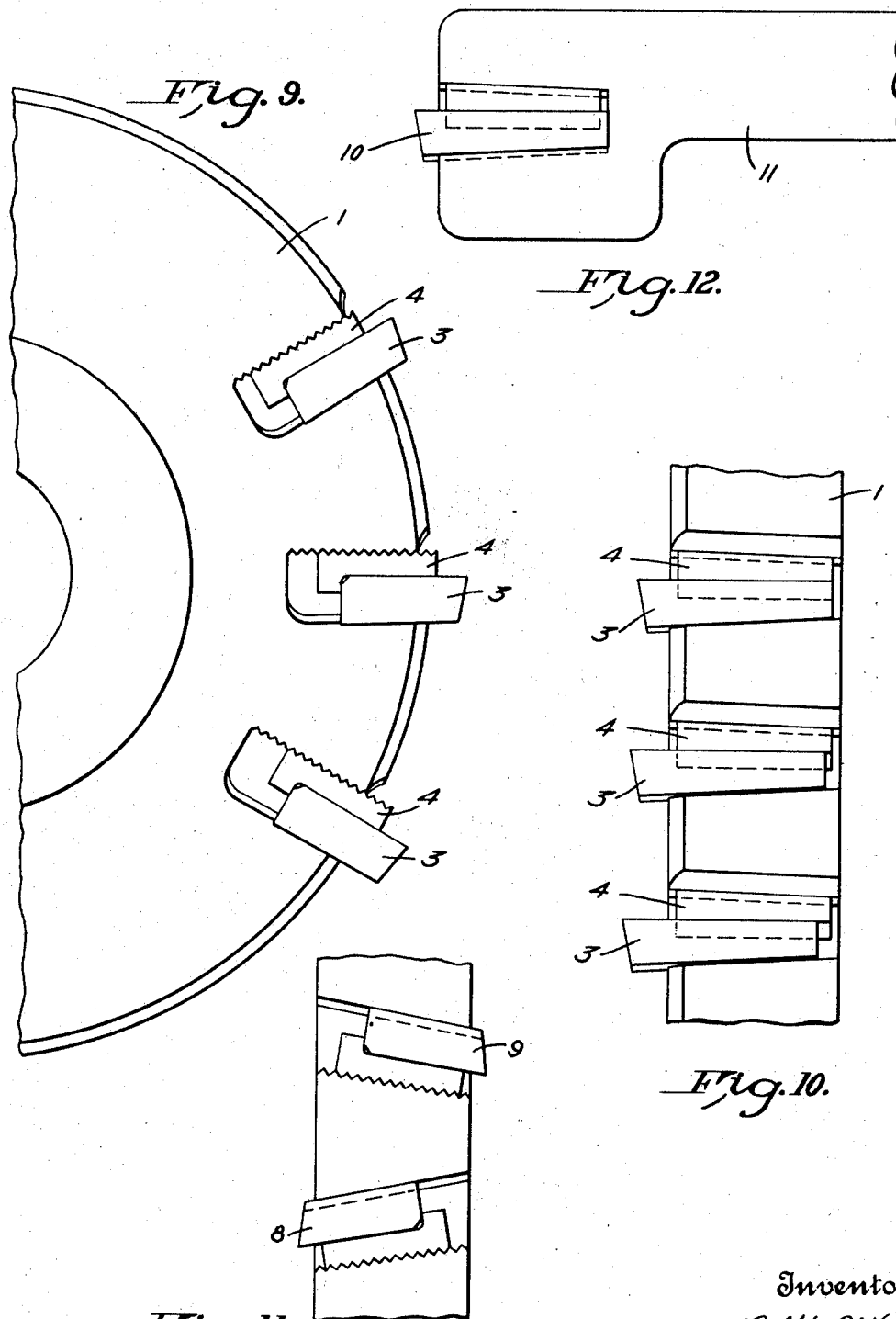
Inventor
Ralph R. Weddell
By Attorney
Nathan, Bowman & Helferich Patented June 12, 1934

1,962,162

UNITED STATES PATENT OFFICE 1,962,162

STEP LOCKED INSERTED BLADE CUTTER

Ralph R. Weddell, Shelton, Conn., assignor to The O. K. Tool Company, Inc., New York, N. Y., a corporation of New York Application March 27, 1931, Serial No. 525,695

9 Claims. (Cl. 29—105)

This invention relates to cutter tools, and more specifically to that type of cutter tool commonly known as an inserted blade cutter. In such type of cutter two primary purposes are accomplished, namely, that of being able to replace worn out blades and thereby obtaining in effect a new cutter in lieu of the expense and delay of complete replacement of the entire cutter; and of being able to utilize in the blades, materials of greater hardness and capable of withstanding high temperatures and possessing other qualities particularly desirable in that portion of the cutter, as contrasted with the supporting body which preferably is made of material more readily machinable and having characteristics such as toughness compatible with the particular functions required thereof.

In the development of inserted blade cutters the further advantage has been also extensively sought of providing practical means enabling the blades to be progressively adjusted to compensate for wear, thereby prolonging the life of the blades making even the substitution of new blades a less frequent necessity.

In view of the fact that the capacity of machine tools and the quality of the work produced is dependent to such a large extent upon the cutters, extensive research has been devoted to this art and a great variety of ingenious arrangements have been conceived and proposed. A problem which has proven insurmountable in the case of most of these prior conceptions of inserted blade constructions has been the inability to retain the required rigidity and to keep pace with the increasingly severe operating conditions imposed upon cutters with the development of more powerful operating machines. This is especially true where it is desired to use the newer special alloy cutting materials capable of withstanding e. g. greater strains and temperatures. The limitation on the forces to which these special alloys may be subjected is, in most cases, the ability of maintaining the blade solidly and immovably mounted in its supporting body.

The present invention provides an arrangement capable of meeting these combined problems of removability and adjustability of the blades; but possessing, when assembled, an extreme rigidity and freedom from misalignment of the blades.

Another problem heretofore encountered which the present invention is especially adapted to meet is in connection with the operation of manufacturing the blades from special alloys such as the commercially known stellite, and various alloys of tungsten, cobalt, and others. Owing to their extreme hardness and unworkability by ordinary shop methods it has proven exceedingly difficult and costly, if not impossible, to form these alloys into the special intricate forms required by many of the heretofore developed constructions for inserted blade cutters.

The arrangement provided in the present invention is such as to enable the cutting section of the insertable blade means to be made in very simple shapes with e. g. substantially plain rectangular surfaces. In accordance with this invention the insertable blade means is made in two sections, the one section being the cutter member proper just referred to, and the other section constituting a cooperating locking member which also provides the more involved shapes required for adjustment as well as locking. All the more intricate shapes are imposed upon the locking member which, since it does no cutting, may be made of a softer material more readily machined by conventional shop methods.

The invention affords ready adjustment of the cutter blade section in both of two directions to compensate for normal wear; and at the same time the blade section, when firmly engaged in a particular selected position, is held with extreme rigidity, being wedged in one direction, and supported by a substantial abutment against movement in a direction transverse thereto. The normal cutting forces on the blade tend to cause this securing means to more firmly secure the blade in its locked position. The result is an extremely rugged cutter tool when assembled, yet providing means for ready replacement or adjustment of the blades.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an end view of a face milling cutter showing the invention incorporated therein. Fig. 2 is a side view thereof looking from the right in Fig. 1. Figs. 3, 4 and 5 are detail views of the cutter blade proper looking at various sides thereof. Figs. 6, 7 and 8 are somewhat similar views of the locking member. Fig. 9 is a fragmentary end view of a cutter similar to that of Fig. 1, showing typical adjusted positions of the cutter blade in a radial direction. Fig. 10 is a side view corresponding to Fig. 9 and showing various positions of the cutter blade adjusted in axial direction. Fig. 11 shows the invention incorporated in an alternate angle or slotting cutter; and Fig. 12 shows the invention in a shank type holder.

Referring to Figure 1, the illustration there depicts a rotary cutter of the face mill type composed of a cutter body 1 having a series of insertable sectional blade means 2, such blade means consisting of the section 3 which is the cutter blade proper; and the section 4 constituting a means for locking the blade member 3 in selected adjusted positions. The blade section 3 is tapered in a longitudinal direction as shown in Fig. 4 and also in a transverse direction as shown in Fig. 3.

The locking member 4 is also tapered in a longitudinal direction as best shown in Fig. 7. The surface of the locking member 4 opposite to the blade 3 and also the adjoining surface of the slot in the body member are provided with interfitting complemental formations extending in the direction of the taper and serially arranged transversely thereto. As specifically illustrated these formations consist of serrations 5 on the surface of the locking member 4 and complemental serrations 6 on the adjoining surface of the slots. The locking member is also provided with a ledge portion 7 which serves as an abutment against which the inner edge of the blade member 3 bears, and is thereby supported against the cutter forces acting radially on the blade.

The sides of the blade slots are at an angle, shown at $a$ in Fig. 2, which may be selected as five degrees. The longitudinal taper of the blade section, shown as angle $b$ in Fig. 4 may then be approximately three degrees; and the taper of angle $c$ of the wedge member 4, shown in Fig. 7, approximately two degrees. The combined taper of the locking member 4 and the blade section 3, therefore, corresponds to the taper of the slot in the cutter body. As heretofore stated the blade section 3 is also tapered transversely, this angle being indicated at $d$ in Fig. 3 and may be selected as approximately two degrees, the slots in the cutter body being correspondingly tapered. The net result is that the two sections 3 and 4, when arranged adjacent each other in the normal manner in the cutter body combinedly form a taper transversely, which in Figure 1 is radially of the cutter body. This functions as a means for adjusting the blade longitudinally when the blade is adjusted radially.

This method of adjustment will now be more particularly described in connection with Figs. 9 and 10. Fig. 9 shows the sectional blade means progressively advanced in successive slots by one serration. Fig. 10 illustrates the corresponding simultaneous adjustment produced on the blade longitudinally when adjusted radially. Since the sides of the slots converge outwardly in a direction transverse to the longitudinal taper of the blade the result is that when the sections are advanced outwardly from the axis of the cutter the blades will normally project a proportionately greater distance from the cutter body in an axial direction as shown in Fig. 10. The amount of axial adjustment effected when a radial adjustment is made is dependent upon the relative tapers. However, with any given tapers the amount of the axial adjustment concurrently effected with a radial adjustment is dependent to a certain extent upon the distance that the locking member 4 is set to protrude into the slot. For example, referring to Fig. 2, if the locking member 4 is given a position further to the right the corresponding cutter blade member 3 will project further to the left. In other words, a longitudinal adjustment may be given the cutter blade member independent of any transverse, or, in the specific type of cutter shown in Figs. 1 and 2, any radial adjustment. Irrespective of the particular adjusted positions the relation of the opposed sections and their combined relation to the slot always remains such that full and complete contact between the main bearing surfaces is always maintained. It is understood that the position of the blade sections shown in Figs. 9 and 10 is merely for the purpose of illustrating the manner in which the blades may be adjusted. Any unnecessary overhanging of the blades is, of course, to be avoided, the adjustment being primarily for the purpose of compensating for wear and grinding of the blades and the blades would not normally project to the extent shown in Figs. 9 and 10.

The arrangement depicted provides a cutter having all the advantages of blade replacement and adjustability characteristic of an inserted blade type cutter; and at the same time the assembled product is possessed of unusual rigidity and freedom from disturbance of the blade positons under the enormous strains to which they are subjected under conditions of operation.

A particular advantage inherent in the construction disclosed is that relating to the shape of the cutter blade section 3. As illustrated in the drawings, it may be of very plain simple design, having no serrations or intricate formations of any kind and may, therefore, be readily cast or otherwise produced from the various special alloy cutting materials frequently desired to be employed. All of the sharply contoured and irregular shapes are produced in the locking member, which may be of such material as to be readily machined in accordance with ordinary shop practice, as compared with the special alloys which can only be so shaped and produced, if at all, with extreme difficulty and at prohibitive cost.

It is to be understood that the present invention may be employed with practically any of the types of conventional cutters. Fig. 11, e. g. illustrates the compound sectional blade construction incorporated in a type of tool commonly known as an alternate angle or slotting cutter. It will be observed that this type of cutter is provided with right and left hand cutter blades, the cutter blade 8 being adjustable to the left and the cutter blade 9 to the right in Fig. 11, a radial adjustment being simultaneously produced in each case.

Fig. 12 shows the invention incorporated in a shank type of holder such as would be normally employed as a lathe tool. The adjustment of the blade 10 in the shank 11, in the case of the particular shank tool shown, would be to the left and upward away from the plane of the paper.

The term "blade" as employed herein is not intended to mean a cutter member which is necessarily of a plate-like shape but may consist, where circumstances demand, of a cutter bit of a different shape in accordance with the requirements of the particular environment.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. An insertable blade cutter tool combining a supporting body having a longitudinally tapered blade opening; and cutter blade and blade locking means therein comprising a longitudinally tapered blade member having plane side walls, a locking member co-acting therewith, a series of similar interfitting formations on said locking member and the adjacent wall of the opening for selective positioning of said locking member in a direction transverse to the direction of said taper, and an abutment provided by said locking member and forming a seat for the blade to support the blade against inward movement transverse to said taper, said members being positioned adjacent each other and co-acting to form a wedge resisting inward movement in the direction of said taper.

2. An insertable blade cutter tool combining a supporting body having a longitudinally tapered blade opening therein; and a combined blade and locking means adapted to be wedged therein comprising a blade member, a locking member adapted to bear against said blade on one side and against the wall of said opening on the opposite side, complemental serrations on said locking member and said wall extending in the direction of said taper for selective position of said wedge in a direction transverse to said taper, and a ledge on said locking member engaging the inner edge of said blade member to support the latter against inward movement relative thereto transverse to said taper.

3. An insertable blade cutter tool combining a supporting body having a tapered blade opening; and a blade member and a locking member adapted to be wedged and positively locked against transverse movement in said opening, said members having plane surfaces adapted to closely fit against each other and to combinedly form a wedge, said locking means including in combination with the wedging means similar interfitting formations on said locking member and the adjacent wall of the opening extending in the direction of said taper and serially arranged transversely thereto, and an abutment provided by said locking member adapted to form a seat for said blade member permitting relative movement therebetween in the direction of said taper for complete wedging but supporting said blade member against inward movement transverse to said taper and to said locking member.

4. An insertable blade cutter combining a supporting body having an opening therein; a blade member and a co-acting locking member therein, said opening being tapered with the sides diverging outwardly in one direction and with the sides converging outwardly transversely to said first direction, said members being arranged to bear against each other and being combinedly shaped corresponding to said opening; and means co-acting with said tapers for locking said members in said opening comprising serrations on the adjacent surfaces of said locking member and the opening extending in the direction of said first taper, and an abutment means between said members adapted to permit relative sliding movement between said members in the direction of said serrations prior to insertion in said opening, but preventing inward movement of said blade member relative to said locking member.

5. An insertable blade cutter tool combining a supporting body having an opening therein; a blade member and a locking member mounted therein said blade member being tapered longitudinally thereof and said opening being correspondingly tapered whereby said blade is longitudinally wedged therein adjacent said locking member; serrations on said locking member and the adjoining surface of said opening extending in the direction of said taper; and engaging abutment means between said members preventing inward movement of said blade member relative to said locking member transverse to said taper but enabling longitudinal sliding movement between said members when not wedged in said slot, and said opening having its sides converging outwardly transverse to said longitudinal taper, and said members being combinedly shaped in accordance therewith whereby the blade may be adjusted and locked in selective positions advanced as to both said longitudinal direction and transversely thereto.

6. An inserted blade rotary cutter tool combining a supporting body having a series of blade openings therein; a longitudinally tapered blade member having plane unbroken faces and a co-acting locking member in said openings, said openings being correspondingly tapered to provide wedge securing means for the blade and locking member; a series of complemental interfitting formations on said locking member and the adjoining surface of said opening permitting relative sliding movement of said locking member in the direction of said taper to ensure said wedging action and providing means for selective positioning of said locking member transverse to said taper, and an abutment provided by said locking member forming a seat for said blade member for positively securing said blade member against inward movement transversely to said taper under cutting forces.

7. An adjustable blade rotary cutter tool combining a supporting body having a series of blade openings therein, one wall of each of said openings being plane and the opposite wall being serrated; a longitudinally tapered blade member having substantially smooth side walls and a co-acting locking member mounted in each of said openings, the former engaging the plane wall and the latter engaging the serrated wall, said openings being correspondingly tapered to provide a wedging means for said blade and locking members; serrations on said locking members and the adjoining surface of the corresponding opening preventing transverse movement of said locking members; and an abutment provided by said locking member forming a seat for said blade member for positively preventing inward movement of said blade members transverse to the respective locking member.

8. An inserted blade cutter tool combining a supporting body having a blade slot tapered in the direction of the longitudinal axis of the tool; a tapered blade member having plane side walls and a locking member mounted in opposed contacting relation in said opening; serrations on one side only of said locking member and the adjoining surface of said opening extending in the direction of said taper; and a ledge on said locking member extending in the direction of said taper adapted to engage the inner longitudinal edge of said blade member to positively prevent inward transverse movement of said blade member.

9. An inserted blade cutter combining a supporting body having a blade slot tapered in the direction of the longitudinal axis of the tool; and blade means mounted therein comprising a pair of opposed contacting sections each tapered in a similar direction and combinedly conforming to the taper of said slot to form a wedging means, the first of said sections being provided with cutting edges, the surface of the other of said sections and the adjoining surface of said slot being provided with serrations extending in the direction of said taper, said other section also being provided with a projecting ledge underlying said first section thereby positively preventing inward movement of first section transverse to said second section and thereby to said slot.

RALPH R. WEDDELL.